FIG.I

INVENTORS
ROBERT S. MUELLER
I. MACIT GUROL
BY *Hoffmann and Yount*
ATTORNEYS

INVENTORS
ROBERT S. MUELLER
I. MACIT GUROL

BY *Hoffmann and Yount*

ATTORNEYS

June 13, 1967 R. S. MUELLER ET AL 3,324,978
SPEED GOVERNOR
Filed July 21, 1965 4 Sheets-Sheet 3

INVENTORS
ROBERT S. MUELLER
I. MACIT GUROL
BY Hoffmann and Yount
ATTORNEYS

United States Patent Office 3,324,978
Patented June 13, 1967

3,324,978
SPEED GOVERNOR
Robert S. Mueller, Oak Park, and I. Macit Gurol, Farmington, Mich., assignors to Eaton Yale & Towne Inc., a corporation of Ohio
Filed July 21, 1965, Ser. No. 473,787
29 Claims. (Cl. 192—3)

The present invention relates to a mechanism for positioning a control member for controlling a specific condition and, in particular, relates to a speed governor mechanism for positioning a throttle control member of an automotive vehicle for controlling the speed of the vehicle.

The desirability of speed governor mechanisms for use in vehicles is well recognized. In general, speed governors operate to position the throttle member of a vehicle to maintain a selected vehicle speed without requiring the operator of the vehicle to keep his foot on the accelerator pedal. Furthermore, certain speed governors permit overriding of the control mechanism upon depression of the accelerator pedal for passing and effect return of the vehicle to the selected speed when the operator's foot is removed from the accelerator. Also speed governor mechanisms are rendered inoperative upon depression of the brake pedal of the vehicle and may be again rendered operative to maintain the selected speed.

An object of the present invention is the provision of a new and improved speed governor mechanism constructed so as to perform all of the above-noted functions and which is reliable in operation, durable, quickly responsive to a decrease in vehicle speed and is capable of being readily adjusted at any time from one speed to a higher or lower speed to maintain the vehicle at the new speed.

A further object of the present invention is the provision of a new and improved speed governor mechanism of the vacuum type having a valve member which is movable to provide a vacuum in a vacuum chamber and thereby effect movement of the throttle of the vehicle, and wherein the valve member is connected for movement with a member acted upon by oppositely directed forces, one force being applied by a speed sensing means, which force increases as vehicle speed increases, and the other force being applied by an actuating means, which force is variable in accordance with the desired speed setting of the governor mechanism, and wherein these forces are balanced when the vehicle is at the desired or set speed so that on a change in the force applied by the speed sensing means to the member, the member moves to effect movement of the valve member.

A further object of the present invention is the provision of a new and improved speed governor mechanism of the vacuum type, as noted in the next preceding object, wherein the actuating means for applying a force to the member which moves to effect movement of the valve member is a magnetic force provided by energization of an electric coil, and wherein the force is variable by varying the current flowing through the coil by setting of a control member.

A still further object of the present invention is the provision of a new and improved vacuum speed governor mechanism wherein an electric coil provides a magnetic force acting on a member which is connected with a valve member to effect movement thereof, and wherein the magnetic force acts in opposition to a force applied to the member by a speed sensing means, and wherein an adjustable resistance is provided in the circuit to the electric coil so that the current flowing through the coil may be varied to vary the magnetic force acting on the member.

Another object of the present invention is the provision of a new and improved speed governor mechanism, as noted in the next preceding object, wherein the current flowing through the electric coil is increased by simultaneously decreasing the resistance in series with the coil and increasing the resistance in parallel with the coil.

Further objects and advantages of the present invention will be apparent to those skilled in the art to which it relates from the following detailed description of the preferred embodiment thereof made with reference to the accompanying drawings forming a part of this specification and in which.

The present invention provides a control mechanism for positioning a control member for controlling a specific condition in response to sensing of the condition. The control mechanism of the present invention may be utilized in association with an engine to maintain a given engine speed and is operable to restore the given engine speed in the event that the engine speed varies from the given speed. The present invention is preferably embodied in a speed governor mechanism for controlling the position of a throttle control member of an automottive vehicle which controls the speed of the vehicle. The position of the throttle control member is controlled by the speed governor mechanism in response to sensing of the speed of the vehicle, and the speed governor mechanism is operable to sense changes in vehicle speed from a set or desired speed and restore the vehicle speed to the desired speed. As representing the preferred embodiment of the present invention, a speed governor mechanism associated with an automotive vehicle engine is illustrated in FIG. 1.

Figure 1:
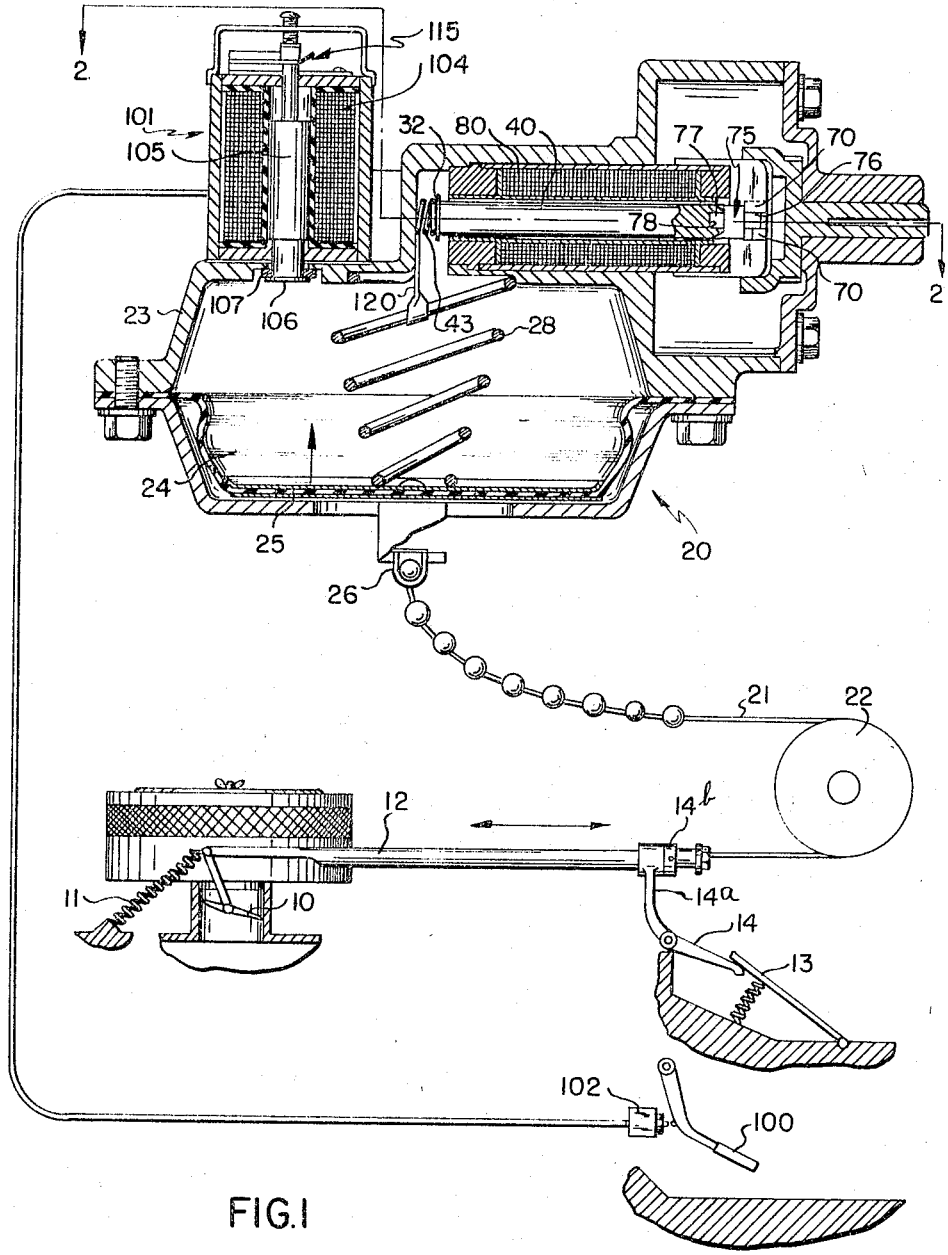
FIG. 1 is a schematic view illustrating a speed governor mechanism embodying the present invention.

The speed governor mechanism of FIG. 1 is operable to control the position of a throttle control member 10 of the automotive vehicle in which the speed governor mechanism is utilized. The throttle control member 10 is movable from a closed position, illustrated in FIG. 1, toward a fully open position in a throttle opening direction for increasing the vehicle speed and is moved in the reverse direction toward its closed position for decreasing the vehicle speed. The throttle member 10 is biased to its closed position by a spring member 11, one end of which engages a suitable fixed support member and the other end of which engages one end of a rod 12 which is connected to the throttle member 10. The rod 12 is connected to the throttle member 10 so as to effect movement of the throttle member 10 between its positions upon linear movement thereof. As viewed in FIG. 1, when the rod 12 moves to the right, the throttle member 10 moves in its throttle opening direction and when the rod member 12 moves to the left, the throttle member 10 moves in a throttle closing direction.

The rod 12 is, as noted above, biased by the spring member 11 to the left and is moved to the right by depression of the accelerator pedal 13 of the automotive vehicle. As the accelerator pedal 13 is depressed, the spring 11 applies a greater force tending to bias the rod 12 against movement by the accelerator pedal. The accelerator pedal 13, when depressed by the operator's foot, actuates a bell crank link member 14, in the embodiment shown in FIG. 1, and effects movement of the arm 14a, which forms a part of the link 14, toward the right. The arm 14a is slidably mounted on the rod 12 and engages a collar 14b thereon to effect movement of the rod 12 toward the right when the arm moves toward the right, thereby effecting movement of the throttle member 10 in a throttle opening direction.

The throttle member 10 also may be moved in its throttle opening direction by means of a speed governor unit 20 which is operatively connected to the rod 12 by means of a flexible chainlike member 21. The chain member 21 is trained around suitable pulleys, such as 22, to effect movement of the rod 12 upon actuation of the speed governor unit 20. The speed governor unit 20 is of the so-called vacuum type and includes a housing 23 which defines in part a vacuum chamber 24. The housing 23 supports a flexible diaphragm 25 which forms a wall of the vacuum chamber 24. The diaphragm 25 is connected by means of a suitable clip 26 to the end of the chain member 21 opposite the end connected with the rod 12. Movement of the flexible diaphragm 25 in the direction of the arrow, shown in FIG. 1, is in the direction to effect movement of the rod 12 toward the right, as viewed in FIG. 1, through the chain connection 21 and movement of the throttle member in its throttle opening direction.

The diaphragm 25 is moved in the direction of the arrow shown in FIG. 1 in response to the creation of a vacuum of sufficient degree in the vacuum chamber 24 and is biased to its position shown in FIG. 1 by means of a suitable spring 28 and spring 11. When the vacuum in the vacuum chamber 24 and the force applied by springs 11 and 28 balance, the diaphragm stops moving and is in an equilibrium condition. If the vacuum is then either increased or decreased, the diaphragm will move. If the vehicle speed decreases, as when the vehicle goes up a hill, the vacuum increases to move the diaphragm to increase the throttle opening. If the vehicle speed increases, as when the vehicle goes down a hill, the vacuum decreases and the diaphragm moves so that the spring 11 moves the throttle member 10 in a speed decreasing direction. In this manner, the speed governor unit 20 tends to maintain the vehicle speed substantially constant.

The vacuum in the vacuum chamber 24 is provided through a suitable vacuum connection 30 in the housing 23 which is connected by suitable conduits, not shown, to the intake manifold of the vehicle to apply a vacuum thereat. The vacuum connection 30 communicates with a passage through a vacuum nozzle member 33 which is supported by the housing 23. The chamber 24 also communicates with the atmosphere through a suitable connection 31 having a nozzle member 34 preferably spaced slightly from the nozzle 33 and opposite thereto.

The vacuum in the chamber 24 is controlled by a valve member or flapper member 32, the operation of which will be described in detail hereinbelow but which, in general, controls the amount of communication between the nozzles 33, 34 and the chamber 24. The valve or flapper member 32 is an elongated member which extends between the nozzle members 33, 34. The flapper member 32 is movable relative to the nozzle members 33, 34 and when positioned in contact with the nozzle member 33, substantially blocks communication between the vacuum conduit 30 and the vacuum chamber 24, and the chamber 24 thus is at substantially atmospheric pressure and the diaphragm member 25 is in the position shown in FIG. 1. When the flapper member 32 is positioned from the nozzle member 33, the vacuum connection 30 then communicates with the chamber 24 and a vacuum is established therein causing the diaphragm member 25 to move in its throttle opening direction to effect opening movement of the throttle member 10, if the vacuum in the chamber 24 is sufficient to overcome the bias of the springs 28 and 11.

The flapper member 32 specifically is a flat strip member which extends between the adjacent nozzle members 33, 34 and engages the atmospheric nozzle member 34 when the speed governor is de-energized and the vehicle is at rest. As the vehicle starts and speed increases, the flapper moves toward the nozzle member 33 and when the flapper contacts the nozzle member 33, the governor unit 20 may be actuated, as will be clear from the description hereinbelow. When the governor is actuated to maintain the vehicle at a set speed, the flapper moves away from the nozzle 33 toward the right, as viewed in the drawings, a distance depending upon the set speed and causes a vacuum to be applied to the vacuum chamber 24 causing movement of the diaphragm member 25 in the direction of the arrow to a position dependent upon the degree of vacuum applied to the chamber 24. The governor unit then senses a change in vehicle speed from the set speed and causes movement of the flapper member 32 to vary the degree of vacuum in the vacuum chamber so as to bring the vehicle back to the set speed.

Figure 4:
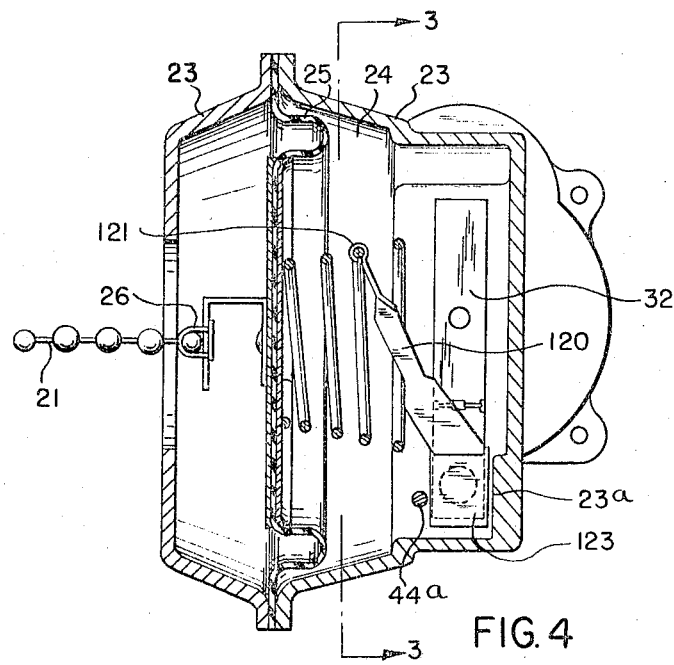
FIG. 4 is a sectional view of the speed governor mechanism shown in FIG. 3, taken approximately along the section line 4—4 of FIG. 3.

Thus, movement of the flapper member 32 controls the movement of the diaphragm 25 which, in turn, controls movement of the throttle member 10. The flapper member 32 moves in response to movement of a member 40, the left end of which, as viewed in the drawings, is operatively associated with the flapper member 32. The left end of the member 40 has a shoulder 41 thereon and a portion 42 which projects through an opening in the flapper member 32. The flapper member 32 is held against the shoulder 41 of the member 40 by means of a spring 43 which applies a biasing force against the member 40 biasing the member 40 to the right, as viewed in the drawings. The biasing force applied by the spring 43 to the member 40 is adjustable by the threading of an end stop member 44 against which the spring 43 seats inwardly and outwardly of the housing 23. The lower end of the flapper 32, as viewed in FIG. 4, extends between a portion 23a of the housing 23 and a pin member 44a. The portion 23a and pin member 44a engage opposite sides of the flapper 32 and guide the movement thereof.

The right end of the member 40, as viewed in FIG. 1, is operatively associated with a speed sensing mechanism 50. The speed sensing mechanism 50 senses the speed of the vehicle and effects movement of the member 40 in response to changes in vehicle speed. The mechanism 50 includes a suitable drive connection 61 that may be connected with the transmission or front wheel of the vehicle and which is driven at a speed in proportion to the speed of the vehicle. The connection 61 is a projection of a drive carriage 62 which has a gear portion 63. The gear portion 63 meshes with a gear 64 having a shaft portion 65 connected thereto and which shaft portion is adapted to be connected with the speedometer of the automotive vehicle.

The drive carriage 62 carries a plurality of weight members 66 which are pivotally supported on the carriage 62 by means of suitable pins 67 which extend through the weights and through suitable projecting portions of the carriage 62. The weight 66 have arm portions 70 which extend toward the axis of rotation of the carriage 62 and which are associated with a suitable drive coupling 75. The drive coupling 75, best seen in FIG. 1, is provided with a projecting portion 76 which is positioned between the projecting arm portions 70 of the weights 66, with the weights extending and overlapping the projecting portion 76 of the coupling 75. Upon rotation of the weights, the arm portions 70 thereof, of course, will effect rotation of the coupling 75 due to the cooperation of the arms with the portion 76 of the coupling 75. The coupling 75 has another projecting portion 77 similar to the portion 76. The projecting portion 77 extends into a groove 78 in the end of the member 40 and thus effects rotation of the member 40 upon rotation of the coupling 75. The coupling 75 also is in axial engagement with the member 40 and upon movement of the coupling member 75 axially, the member 40 likewise moves.

Figure 2:
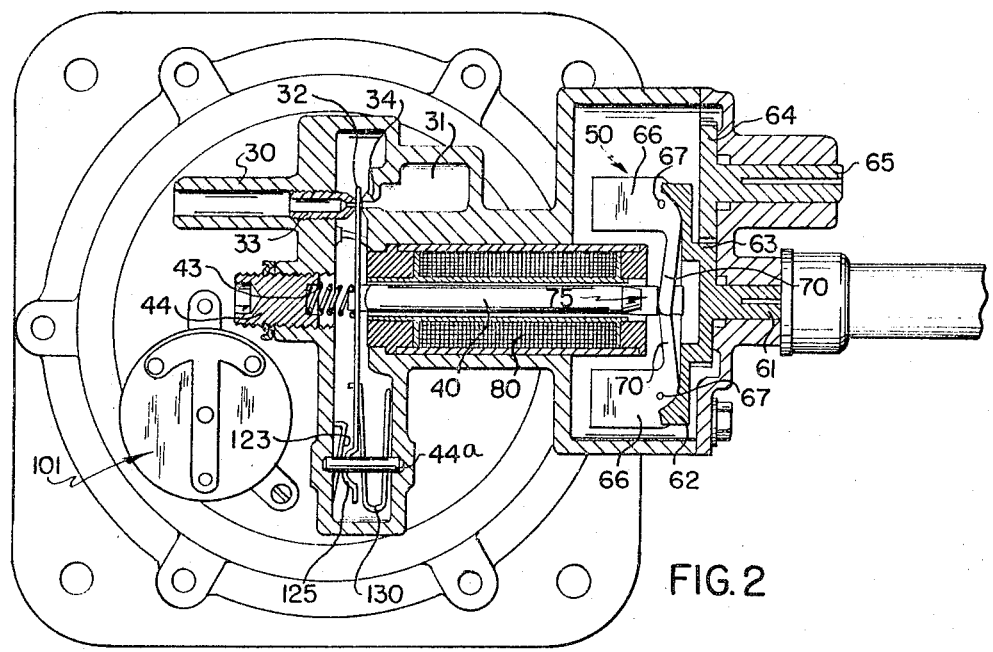
FIG. 2 is a sectional view of a portion of the speed governor mechanism shown in FIG. 1, taken approximately along the section line 2—2 of FIG. 1.

From the description hereinabove, it should be apparent that upon rotation of the weights 66, the arm portions 70 thereof are rotated, thereby effecting rotation of the coupling 75 and of the member 40. Moreover, as the weights 66 increase their speed of rotation, the arm portions 70 thereof move axially toward the left, as viewed in FIG. 2, due to centrifugal force of the weights, causing the coupling 75 to likewise to be moved to the left and causing the member 40 to be moved to the left when the force applied by the weights is sufficient to overcome the bias of the spring 43. As noted above, when the speed governor unit is de-energized, the flapper 32 is out of engagement with the nozzle 33, and in such event, as the member 40 moves due to the increased force applied by the weights 66, the flapper 32 moves toward the vacuum nozzle.

Figure 5:
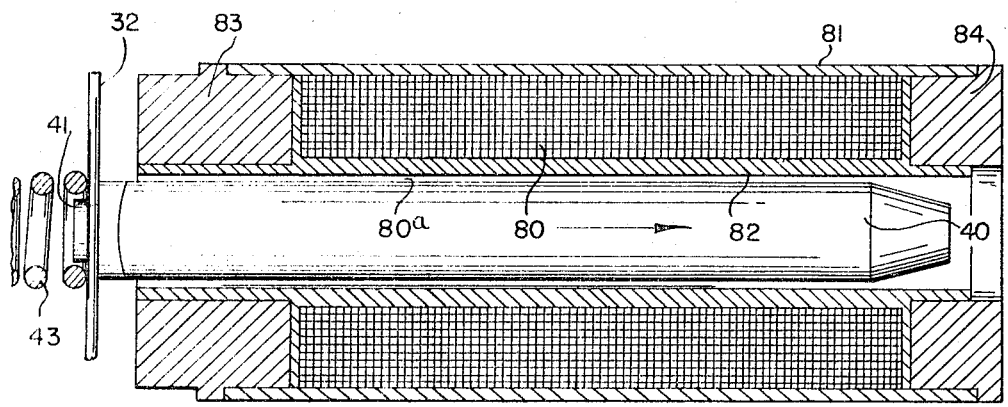
FIG. 5 is a fragmentary sectional view on an enlarged scale of a portion of the speed governor mechanism shown in FIG. 1.

The member 40 is a rod-like member and forms the core member of an electric coil 80. The electric coil 80 is an elongated sleeve-like coil which encircles the member 40 with the member 40 extending through a central opening through the coil 80. The coil member 80, as shown in FIG. 5, is supported between a pair of concentric sleeve members 81, 82 and end caps 83, 84 located at the opposite ends of the coil 80 and having openings therethrough into which the inner sleeve member 82 extends and through which the member 40 extends. The sleeve members 81, 82 and the end cap members 83, 84, as well as the member 40 are all formed of a metal material having a high magnetic permeability so as to provide a good path for magnetic flux. The taper angle on the right end of the plunger 40 and position of the plunger 40 with respect to end cap 84 determines the force versus displacement characteristic of the solenoid. By properly locating the plunger 40 with respect to end cap 84 and/or properly tapering the end of the plunger 40, one can optimize the force versus displacement curve of the solenoid with respect to force versus displacement characteristic of the flyweights, so that the spring 43 is the primary factor in determining the rate of movement of the flapper.

The speed governor unit 20 is energized to maintain vehicle speed at a predetermined or set speed by energizing the electrical coil 80, as will be clear from the description hereinbelow. When the electric coil 80 is energized, it creates a magnetic field with magnetic lines of flux extending through the member 40 and through the end caps 83, 84 and sleeve members 81, 82. The lines of flux are concentrated to flow through these members with a minimum of leakage thereof, and to this end, the flapper member 32 and coupling 75 connected with the member 40 have a relatively low degree of magnetic permeability and the coupling 75 is preferably made of plastic.

The magnetic flux is such as to apply a force to the member 40 tending to cause the member 40 to move in the direction of the arrow shown in FIG. 5 against the force applied by the weights 66 of the speed sensing means 50 to the member 40. Normally, the member 40 is off center in relation to the lines of magnetic flux and the core member is forced by the magnetic field in the direction of the arrow shown in FIG. 5 because of the relative positioning of the core member and the coil 80.

The member 40 is supported in sleeve 82 with its periphery spaced from the inner surface thereof providing an air gap 80a therebetween. The right end of the member 40, as viewed in FIG. 5, is formed with a tapered configuration so as to provide a varying air gap between the sleeve member 82 and the member 40. The air gap increases in width as the member 40 extends to the right, as viewed in the drawings. The lines of flux extending between the member 40 and the sleeve 82 tend to cross a path having the smallest air gap. Since the air gap at the right end of the coil increases as the member 40 extends to the right, the lines of flux tend to concentrate through the portion of the core member which is closest to the sleeve member 82.

As is well known, the force tending to move the member 40 is dependent upon the magnitude of the magnetic field provided upon energization of the coil 80. The magnitude of the magnetic field provided by the coil member 80 is dependent upon the current flowing through the coil 80 with the greater the current flowing through the coil, the greater the strength of the magnetic field. Thus, it should be clear that the force tending to move the member 40 to the right may be varied by varying the current flowing through the coil 80. As will be apparent from the description hereinbelow, the current flowing through the coil 80 is controlled to control the speed at which the governor mechanism holds the vehicle.

As noted hereinabove, with the coil 80 de-energized as the speed of the vehicle starts to increase, the arms of the weights 66 provide a force acting on the member 40, tending to move the member 40 to the left, as viewed in the drawings. The member 40 begins to move to the left when the force of the weights is such as to overcome the bias of the spring 43. When it is desired to actuate the speed governor mechanism to hold the vehicle at a desired speed, the coil member 80 is energized. The coil member 80, however, cannot be energized until the flapper 32 contacts the nozzle member 33. The current flowing through the coil member 80 is controlled so as to provide a current of a magnitude sufficient to provide a force acting through the member 40 against the weights 66, which is equal in magnitude to the magnitude of the force applied by the weights 66 at the desired speed. In other words, the magnetic field provided by the coil 80 is such that the force applied to the member 40 thereby is in equilibrium with the force of the weights at the predetermined or set speed.

If the speed of the vehicle decreases from the predetermined or desired speed, the magnetic field overcomes the force of the weights 66 and causes the member 40 to move to the right. This, of course, causes the flapper member 32 to likewise move to the right away from the nozzle member 33 and provides a greater vacuum in the vacuum chamber 24. If the speed of the vehicle increases above the desired speed, the weights overcome the magnetic force applied to the member 40 and cause the member 40 to move to the left, causing the flapper 32 to move to the left decreasing the vacuum in the chamber 24 and permitting movement of the throttle member 10 by the spring 11 in a speed decreasing direction. This operation will be more clearly apparent upon a description of the preferred circuit diagram in which the coil member 80 is incorporated.

The speed governor mechanism includes means for varying the current through the coil 80 so as to provide a variance in the force applied to the member 40. This adjustment is provided by a potentiometer 90, shown in FIG. 7. The potentiometer 90, of course, is a variable resistance means and is in circuit with the coil 80. By providing a suitable slide connection for the potentiometer 90, the resistance in the circuit including the coil 80 may be varied so as to vary the current flowing through the coil 80 and thereby vary the magnetic force applied to the member 40. The potentiometer may be adjusted at any time in order to vary the energization for the coil 80. The setting of the potentiometer 90 determines the speed at which the vehicle is maintained. The resistance may be adjusted by movement of a certain control member located on the dashboard of the vehicle in any suitable manner and which may be graduated so as to indicate the particular speed setting or particular speed at which the vehicle will be operated, depending upon the position of the control element of the potentiometer. The operation of the potentiometer will be clear from the description hereinbelow of the circuit diagram.

The speed governor mechanism shown in FIG. 1 is constructed so as to be inoperative to control the speed of the vehicle when the brake pedal 100 of the vehicle is actuated. In general, the construction is such that when the brake pedal 100 is actuated, the vacuum chamber 24 is immediately vented to the atmosphere, thereby breaking the vacuum in the chamber 24 and rendering the speed governor inoperative to perform any control on the throttle 10. The brake pedal 100 is operatively associated with a suitable venting mechanism 101 located and carried by the housing 23 of the speed governor unit 20. The venting mechanism 101 is actuated by a normally closed control switch 102 which is located adjacent to the brake pedal 100 and which is opened upon depression of the brake pedal 100. The control switch 102 controls the operation of a solenoid coil 104 forming a part of the control mechanism 101.

Figure 6:
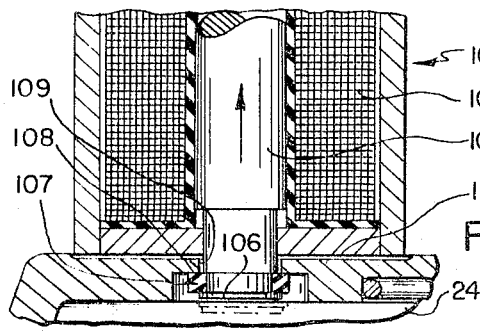
FIG. 6 is a fragmentary view on an enlarged scale of another portion of the speed governor mechanism shown in FIG. 1.

The solenoid coil 104 is operatively associated with a core member 105 which has an end 106 extending into the vacuum chamber 24. The end 106 of the core member 105 carries a seal member 107 which, as shown in FIG. 6, engages with a ledge portion 108 of the housing 23 when the coil 104 is energized. The seal means blocks the vacuum chamber 24 from communication through opening 109 and passageway 112 formed in the housing 23 to the atmosphere. When the coil member 104 is de-energized, the core member 105 takes a lowered position, as shown in FIG. 6, wherein the seal 107 is spaced from the ledge portion 108 of the housing 23. In this position, the chamber 24 is vented to the atmosphere through the opening 109 and through the vent passages 112 in the housing 23.

The switch 102, which controls the energization of solenoid coil 104, has contacts in the circuit to the coil 104, which contacts are normally closed, and thus normally the coil 104 is energized. As best shown in FIG. 1, suitable holding contacts are provided on the upper end of the core 105 and generally designated 115. These holding contacts are such that when the coil 104 is energized and the core 105 is moved upwardly in the direction of the arrow, the holding contacts 115 are closed, thereby holding the coil 104 energized, as will be apparent from the description hereinbelow. The coil 104 is de-energized when the brake pedal is actuated because the switch 102 is opened thereby, thus breaking the circuit to the coil 104.

In view of the volume of air in the chamber 24 which must be evacuated in order to obtain movement of the diaphragm member 25, the speed governor unit 20 is constructed so as to effect rapid operation and quick movement of the diaphragm member 25 and is constructed so that the flapper member 32 moves an amount greater than that which is necessary to effect movement of the diaphragm to its position to maintain the vehicle at the desired speed. To perform this operation, the speed governor unit 20 includes a feedback mechanism for positioning the flapper 32 in accordance with the position of the diaphragm 25. The feedback mechanism which is connected between the diaphragm 25 and flapper 32 includes a means for moving the flapper 32 toward the vacuum nozzle 33 as the diaphgram member 25 moves in its throttle opening direction and which operates independently of the sensing means 50 which moves the member 40.

Figure 3:
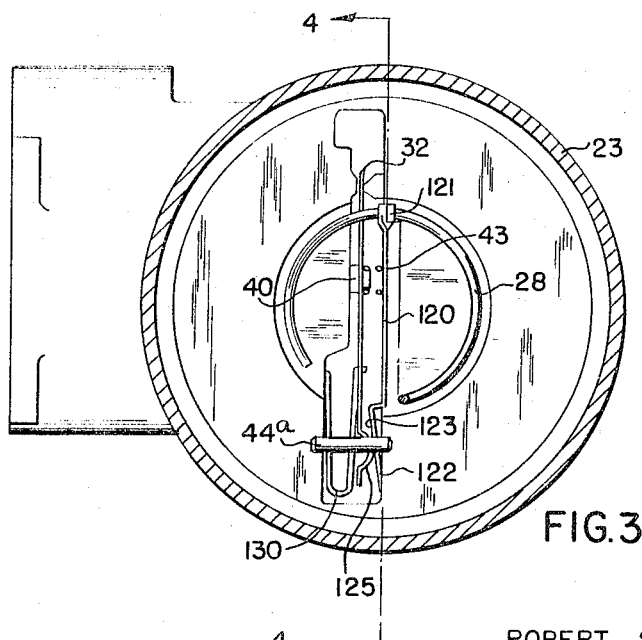
FIG. 3 is a sectional view of a portion of the speed governor mechanism shown in FIG. 4, taken approximately along the section line 3—3 of FIG. 4.

This feedback mechanism includes a suitable lever member 120 having one end 121 connected with a coil of the spring 28 which moves with the diaphragm member and the other end 122 thereof is associated with the lower end of flapper member 32, as viewed in the drawings, to provide for pivotal movement therebetween. The end 122 of the lever member 120 includes a ramp portion 123 which engages a dimple 125 formed on the lower end of the flapper member 32, best seen in FIG. 3. The dimple member 125 of the flapper is biased into engagement with the ramp 123 of the lever 120 by means of a suitable leaf spring 130. As the diaphragm member moves in a speed increasing direction, the ramp portion 123 of the lever 120 moves downwardly causing the flapper member to move toward the vacuum nozzle, due to the engagement of the ramp member with the dimple portion of the flapper. This permits the flapper to be moved a greater distance from the nozzle 33 initially, as is described in copending application, Ser. No. 453,750, filed May 6, 1965, now Patent No. 3,298,482.

The operation of the speed governor mechanism shown in the drawings should be apparent from the description thereof hereinabove. The operation of the governor mechanism will be even more clear upon reference to the circuit diagram shown in FIG. 7 in which various elements forming a portion of the mechanism are incorporated.

Figure 7:
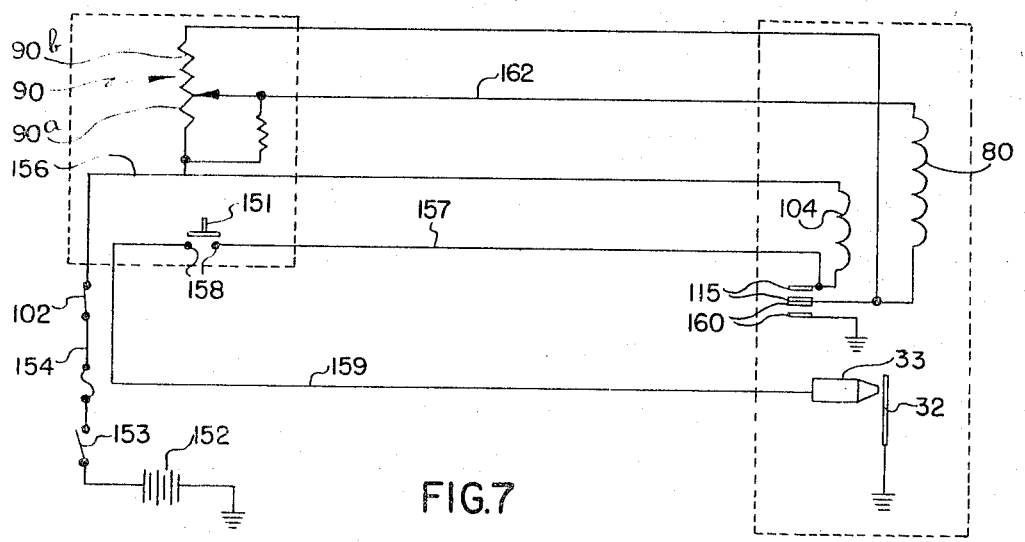
FIG. 7 is a schematic circuit diagram usable with the speed governor mechanism of FIG. 1.

Upon starting of the vehicle, no circuit is completed through the circuit shown in FIG. 7. The flapper member 32, as described hereinabove, is located in engagement with the atmospheric nozzles 34, due to the force of the spring 43 and is held thereagainst until the force applied to the member 40 by the weights 66 is such as to overcome the bias of the spring 43. The spring 43 is set so that the bias of the spring 43 will not permit movement of the core member until the vehicle is operating at a speed of about 30 m.p.h. At about 30 m.p.h., the member 40 moves to the left and the flapper member 32 moves into contact with the vacuum nozzle member 33. When the flapper member 32 engages the nozzle member 33, the speed governor may be energized.

The speed governor may be energized by depression of an engagement or lock-in button 151 located on the dashboard or turn signal lever of the vehicle. Depression of the lock-in button 151 causes a circuit to be completed from a battery 152 through an ignition switch 153, a conductor 154, normally closed brake switch 102, conductor 156, the coil 104, conductor 157, now closed contacts 158 of the switch 151, conductor 159, vacuum nozzle 33, and flapper 32 to ground. The vacuum nozzle 33 is, therefore, insulated from the housing 23 and the housing 23 is preferably made of plastic. This causes energization of the coil 104. When the coil 104 is energized, the core 105 thereof is pulled in an upward direction, as viewed in FIG. 6, causing the vent passageway from the chamber 24 to the atmosphere to be closed, due to the sealing contact of the seal 107 with the ledge portion 108 of the housing 23. At the same time, holding contacts 115 for the coil 104 are closed, thereby holding the coil 104 energized and, at the same time, holding contacts 160 are closed, both of which hold the coil 104 energized, even though the lock-in button 151 is open.

Simultaneous with the energization of the coil 104, a circuit is completed from the battery 152 through the ignition switch 153, conductor 154, normally closed contacts of the brake switch 102, conductor 156, a resistance portion 90a of the resistance of the potentiometer 90, conductor 162, coil 80, holding contacts 160 to ground, thereby energizing the coil 80. A circuit is also completed through resistance 90b of the potentiometer which is in parallel with the coil 80.

As noted hereinabove, the energization of the coil 80 is dependent upon the setting of the potentiometer. The resistance 90a being in series with the coil 80 has a direct effect on the current flowing through the coil 80. The smaller the resistance 90a, the greater will be the current flowing through the coil 80. Therefore, the smaller the resistance 90a, the higher the speed setting of the governor mechanism. The resistance 90b of the potentiometer also has an effect on the current flowing through the coil 80. The resistance 90b is in parallel with the coil 80 and as the resistance 90b increases, the voltage drop across the coil 80 increases and the current flowing through the coil increases. Thus, by adjusting the potentiometer, the resistance 90a in series with the coil 80 is adjusted, as well as the resistance 90b in parallel with the coil 80 and as the resistance 90a in series decreases, the resistance 90b in parallel increases, and vice versa. As noted above, upon energization of the coil 80, a force is applied to the member 40 acting against the biasing force of the speed sensing mechanism 50.

If the vehicle speed is below the desired or set speed when the speed governor is energized, the force applied to the member 40 is such as to overcome the force of the speed sensing weights and causes the flapper 32 to be moved to the right, as noted hereinabove. This causes an increase in the vacuum in the chamber 24 and causes the vehicle to be increased in speed until the force which is applied by the weights balances against the force applied by the energization of the member 40 to the weights and thereby causes a balancing of the flapper in a particular position between the vacuum nozzle member 33 and the atmospheric nozzle member 34, at the desired speed. The diaphragm member 25 thus also has a particular position at the desired or set speed. Any additional increase or decrease in the speed of the vehicle causes a change in the force applied to the member 40 by the speed sensing means 50 and causes the vehicle to either increase or decrease in speed, as noted hereinabove.

In the event that the vehicle is exceeding the speed when the governor is actuated by engaging coil 80, the weights are applying a force to the member 40 which is in excess of the force applied to member 40 by the coil 80. When the operator removes his foot from the accelerator pedal, the vehicle speed decreases to a speed where the force applied by the coil 80 balances the force applied by the weights. Thus, it can be seen that at the desired set speed, the force applied by the coil 80 acting against the force applied by the weights is balanced. Any increase or decrease in speed, when the flapper 32 is in its set speed position causes movement of the flapper 32 to vary the vacuum in the chamber and results in the vehicle being substantially maintained at the set speed.

In the event that the vehicle is at the desired or set speed when the speed governor is actuated, the flapper member 32 moves away from the nozzle member 33 due to the decrease in speed because the operator removes his foot from the accelerator pedal. A vacuum is applied to the vacuum chamber and causes the diaphragm to move to substantially maintain vehicle speed and increase the speed to where the force applied by the weights balances the magnetic force and the flapper is in the position corresponding to the desired speed. As noted above, any increase or decrease in speed, when the flapper 32 is in its set speed position causes movement of the flapper 32 to vary the vacuum in the chamber and results in the vehicle being substantially maintained at the set speed.

Figure 8:
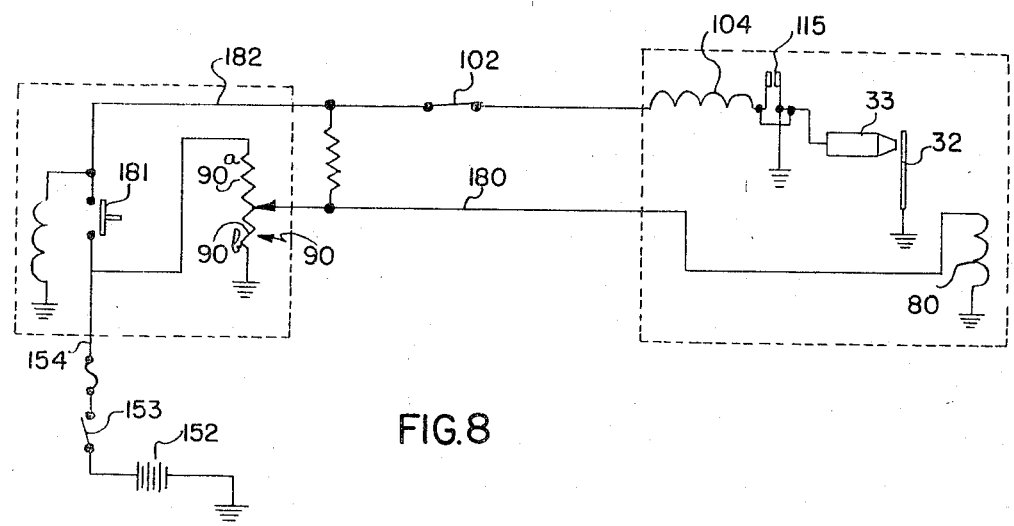
FIG. 8 is a modified circuit diagram usable with the speed governor mechanism of FIG. 1.

FIG. 8 shows another circuit which may be utilized in the speed governor system of FIG. 1. The circuit shown in FIG. 8 is similar to that described hereinabove; however, the coil 80 in this circuit is continuously energized, and in view of the continuous energization of the coil 80, the operation of the governor system is slightly different. Upon starting of the automotive vehicle, a circuit is completed from the battery 152, through the ignition switch 153, conductor 154, the resistance 90a of the potentiometer 90, conductor 180, and the coil 80 to ground, thereby energizing the coil 80. A circuit is also completed through resistance 90b of the potentiometer. Thus, as soon as the automotive vehicle is started, the member 40 is biased by the magnetic field of the coil 80 toward the right against the force of the speed sensing mechanism 50. As the speed sensing mechanism increases in speed, the member 40 moves to the left when the speed sensing mechanism 50 applies a force to the core in the excess of the force applied by the coil 80. This occurs at a speed slightly above the preset or desired speed of the vehicle, at which time the flapper 32 engages the nozzle 30. When this occurs, the speed governor may be actuated by actuation of a lock-in switch 181, and a circuit is then completed from the battery 152 through the ignition switch 153, through conductor 154, switch 181, conductor 182, the normally closed brake switch 102, coil 104, holding contacts 115, nozzle 33 and flapper 32 to ground, thereby energizing the coil 104 and causing the holding contacts 115 thereof to be closed and the vacuum chamber 24 to be sealed. When the operator removes his foot from the accelerator pedal, the flapper member 32 moves away from the nozzle member 33 and the flapper takes a position depending upon the set speed. Upon further movement of the member 40, due to a variance in the speed of the vehicle as sensed by the speed sensing mechanism 50, the flapper 32 is moved toward or away from the nozzle 33 to provide a greater or lesser vacuum in the vacuum chamber to bring the speed of the vehicle back to desired or set speed. From the above, it is believed that the operation of the speed governor mechanism utilizing the circuit of FIG. 8 should be clear and a further description thereof will not be made.

In view of the foregoing, it should be readily apparent that applicant has provided a new and improved speed governor mechanism and certain modifications, changes, and adaptations may be made therein by those skilled in the art to which it relates, and it is hereby intended to cover all such modifications, changes and adaptations therein which come within the scope of the appended claims.

Having described our invention, we claim:

1. A mechanism for moving a control member to control a predetermined condition comprising an actuating member operatively connected to said control member and movable to effect movement of the control member, vacuum chamber means on one side of said actuating member, valve means for providing a vacuum in said vacuum chamber to control movement of said actuating member including a valve member associated with a vacuum conduit and movable relative to the vacuum conduit to vary communication between the vacuum chamber and the vacuum conduit, a control member operatively connected with said valve member and movable to effect movement of said valve member, means responsive to the state of said condition and operable to apply a first force acting on said control member to urge said control member in a first direction and of a magnitude depending upon the state of said condition, means operable to apply a second force to said control member urging said control member in a second direction opposite said first direction including an electric coil energizable to create a magnetic field urging said control member in said second direction, and means adjustable to vary the magnitude of said second force to cause said second force to equal said first force and balance said control member at a desired state for said condition whereby said control member moves to vary the vacuum in said chamber upon a variance in said condition from the desired state.

2. A mechanism for moving a vehicle throttle member to substantially maintain the vehicle at a desired speed comprising an actuating member operatively connected to said throttle member and movable to effect movement of said throttle member, vacuum chamber means on one side of said actuating member, valve means for providing a vacuum in said vacuum chamber to control the movement of said actuating member including a valve member associated with a vacuum conduit and movable relative to the vacuum conduit to vary communication between the vacuum chamber and vacuum conduit, a control member operatively connected with said valve member and movable to effect movement of said valve member, means responsive to the speed of said vehicle and operable to apply a force acting on said control member to urge said control member in a first direction and of a magnitude depending upon the speed of said vehicle, means operable to apply a second force to said control member urging said control member in a second direction opposite said first direction including an electric coil energizable to create a magnetic field urging said control member in said second direction, and means adjustable to vary the magnitude of said second force so that said second force equals said first force at the desired vehicle speed to balance said control member whereby said control member moves to vary the vacuum in said vacuum chamber upon a variance in vehicle speed from the desired speed.

3. A mechanism for moving a vehicle throttle member to substantially maintain the vehicle at a desired speed comprising an actuating member operatively connected to said throttle member and movable in a first direction to effect movement of said throttle member in a speed increasing direction and in a second direction to effect movement of said throttle member in a speed decreasing direction, vacuum chamber means on one side of said actuating member, valve means for providing a vacuum in said vacuum chamber to control the movement of said actuating member including a valve member associated with a vacuum conduit and movable in first and second directions relative to the vacuum conduit to increase and decrease, respectively, communication between the vacuum chamber and vacuum conduit, a control member operatively connected with said valve member and movable in first and second directions to effect movement of said valve member in its said first and second directions, respectively, means responsive to the speed of said vehicle and operable to apply a first force acting on said control member to urge said control member in said second direction and of a magnitude depending upon the speed of said vehicle, means operable to apply a second force to said control member urging said control member in said first direction including an electric coil energizable to create a magnetic field urging said control member in said first direction, and means adjustable to vary the magnitude of said second force so that said second force equals said first force at the desired vehicle speed to balance said control member whereby as vehicle speed decreases from said desired speed said control member moves in its first direction to cause said valve member to move in its first direction causing said throttle member to move in its speed increasing direction and as vehicle speed increases from said desired speed said control member moves in its second direction to cause said valve member to move in its second direction causing said throttle member to move in its speed decreasing direction.

4. A mechanism for moving a vehicle throttle member to substantially maintain the vehicle at a desired speed comprising an actuating member operatively connected to said throttle member and movable in a first direction to effect movement of said throttle member in a speed increasing direction and in a second direction to effect movement of said throttle member in a speed decreasing direction, vacuum chamber means on one side of said actuating member, valve means for providing a vacuum in said vacuum chamber to control the movement of said actuating member including a valve member associated with a vacuum conduit and movable in first and second directions relative to the vacuum conduit to increase and decrease, respectively, communication between the vacuum chamber and vacuum conduit, a control member operatively connected with said valve member and movable in first and second directions to effect movement of said valve member in its said first and second directions, respectively, means responsive to the speed of said vehicle and operable to apply a first force acting on said control member to urge said control member in said second direction and of a magnitude depending upon the speed of said vehicle, means operable to apply a second force to said control member urging said control member in said first direction including an electric coil energizable to create a magnetic field urging said control member in said first direction, and means adjustable to vary the current through said electric coil to thereby vary the magnitude of said second force so that said second force equals said first force at the desired vehicle speed to balance said control member.

5. A mechanism as defined in claim 4 wherein said control member comprises a core member of high magnetic permeability extending through said coil, and said coil is supported by support members having a high magnetic permeability, and said core member and support members provide a path for the magnetic flux produced upon energization of said coil.

6. A mechanism as defined in claim 5 wherein said means responsive to the speed of the vehicle and operable to apply a force to said control member comprises speed sensing means including weight members having portions movable axially in response to changes in vehicle speed and coupling means for plastic material interconnecting said portions of said weight members and said core member.

7. A mechanism as defined in claim 5 wherein said coil is supported by a sleeve member extending therethrough and said core member extends through said sleeve member with an air gap therebetween and the one end of said core member remote from said valve member converges to provide a varying air gap effective to concentrate the lines of flux extending between the one end of said core member and said sleeve.

8. A mechanism as defined in claim 4 wherein said means applying said second force further includes a spring biasing said control member in said first direction and which is overcome by said first force at a predetermined minimum speed.

9. A mechanism as defined in claim 8 further including means for venting said vacuum chamber upon depression of the brake pedal of the vehicle and operable to block the venting thereof only when said vehicle is above said predetermined minimum speed.

10. A mechanism as defined in claim 9 wherein said venting means includes a solenoid coil energizable to block venting of said chamber and which is in a circuit including said valve member and a member which the valve member contacts above said minimum speed.

11. A mechanism for moving a vehicle throttle member to substantially maintain the vehicle at a desired speed comprising an actuating member operatively connected to said throttle member and movable in a first direction to effect movement of said throttle member in a speed increasing direction and in a second direction to effect movement of said throttle member in a speed decreasing direction, vacuum chamber means on one side of said actuating member, valve means for providing a vacuum in said vacuum chamber to control the movement of said actuating member including a valve member associated with a vacuum conduit and movable in first and second directions relative to the vacuum conduit to increase and decrease respectively communication between the vacuum chamber and vacuum conduit, a control member operatively connected with said valve member and movable in first and second directions to effect movement of said valve member in its said first and second directions, respectively, means responsive to the speed of said vehicle and operable to apply a first force acting on said control member to urge said control member in said second direction and of a magnitude depending upon the speed of said vehicle, means operable to apply a second force to said control member urging said control member in said first direction including an electric coil energizable to create a magnetic field urging said control member in said first direction, and variable resistance means in a circuit including said coil and adjustable to vary the current through said coil and the magnitude of said second force so that said second force equals said first force at the desired vehicle speed to balance said control member.

12. A mechanism as defined in claim 11 wherein said variable resistance includes a control member located for operation by the operator of the vehicle and settable to set the resistance in circuit with said coil and thereby set the vehicle speed to be maintained.

13. A mechanism as defined in claim 11 wherein said variable resistance means includes a resistance in series with said coil and a resistance in parallel with said coil, and said resistance means has an adjustable member movable to simultaneously increase the resistance in parallel and decrease the resistance in series with said coil.

14. A mechanism as defined in claim 11 wherein said coil is in a circuit including a control switch and may be energized upon actuation of the control switch when the vehicle is above a predetermined speed.

15. A mechanism as defined in claim 11 wherein said coil is in a circuit with the vehicle ignition switch and is energized immediately upon starting of the vehicle, and vent means venting said vacuum chamber and operable to block venting thereof above a predetermined minimum speed.

16. A mechanism as defined in claim 15 wherein said vent means comprises a solenoid coil supported on a housing defining the vacuum chamber and a member extending into the vacuum chamber and carrying a seal member movable to block the vent passageway means upon energization of said solenoid.

17. A mechanism for controlling the position of a throttle member of an automotive vehicle comprising an actuating member operatively connected with the throttle member and movable in one direction to effect movement of the throttle member in one direction, vacuum chamber means on one side of said actuating member, valve means for providing a vacuum in said vacuum chamber to effect movement of the actuating member in said one direction including a valve member associated with a vacuum conduit and movable relative to the vacuum conduit to progressively increase communication between the vacuum chamber and the vacuum conduit, a control member operatively connected with the valve member to effect movement of the valve member upon movement thereof, speed sensing means operatively connected to the control member for applying a force thereto acting upon said control member to tend to move said control member in a first direction to cause movement of the valve member to decrease the vacuum in said vacuum chamber as the speed of the vehicle increases, vent means for venting said vacuum chamber upon actuation of the brake pedal of the vehicle and including a solenoid coil supported adjacent the vacuum chamber and a member extending into the vacuum chamber and carrying a sealing member movable to block vent passageway means upon energization of said solenoid and de-energized to open said vent passageway means upon actuation of the brake pedal of the vehicle.

18. A mechanism for moving a control member movable in opposite directions to effect a control operation comprising an actuating member operatively connected to said control member and movable in one direction to effect movement of the control member in one direction, vacuum chamber means on one side of said actuating member, valve means for providing a vacuum in said vacuum chamber to effect movement of said actuating member in said one direction including a valve member associated with a vacuum conduit and movable from a first position in one direction relative to the vacuum conduit to progressively increase communication between the vacuum chamber and the vacuum conduit, an electrical coil, a core member extending through said coil and movable in a first direction upon energization of said coil, an interconnection between said core member and said valve member effective to provide for movement of said valve member from its said first position to a second position upon energization of said coil, means adjustable to vary the amount of movement of said core member to thereby vary the second position of said valve member to control the degree of vacuum applied to said vacuum chamber, and means for moving said core member from its said second position in response to changes in a predetermined condition to thereby increase or decrease the vacuum in said vacuum chamber and effect movement of said control member upon changes in said condition.

19. A mechanism for moving a vehicle throttle member movable in opposite directions between closed and open positions to control vehicle speed comprising an actuating member movable in one direction to effect movement of the throttle member in a throttle opening direction, vacuum chamber means on one side of said actuating member, valve means for providing a vacuum in said vacuum chamber to effect movement of said actuating member in said one direction, including a valve means associated with a vacuum conduit and movable from a first position relative to the vacuum conduit to progressively increase communication between the vacuum chamber and the vacuum conduit, an electrical coil, a core member extending through said coil and movable in a first direction upon energization of said coil, an interconnection between said core member and said valve member effective to provide for movement of said valve member from its said first position to a second position upon energization of said coil, means adjustable to vary the amount of movement of said core member to thereby vary the second position of said valve member to control the degree of vacuum applied to said vacuum chamber in accordance with the desired vehicle speed, and means for moving said core member from its said second position in response to changes in vehicle speed to thereby increase or decrease the vacuum in said vacuum chamber and effect movement of the control member upon changes in vehicle speed.

20. A mechanism as defined in claim 19 further including feedback means including a feedback member movable with said actuating member upon movement in a throttle opening direction and operable to move said valve member toward its first position as said diaphragm member moves in its said throttle opening direction, said feedback member including a cam portion engageable with a portion of said valve member to move said valve member toward its said first position in response to movement of said cam portion occurring when said diaphrgam member moves in its throttle opening direction.

21. A mechanism as defined in claim 20 wherein said feedback member includes a ramp portion, cooperable with a fulcrum on said valve member and means biasing said fulcrum and ramp portion into engagement.

22. In a governing mechanism for moving a vehicle throttle member to control vehicle speed comprising means for effecting movement of said throttle member including a control member movable to effect movement of said throttle member, a first electrical coil when energized providing for movement of said control member in response to changes in vehicle speed, an electric circuit for energizing said first electrical coil, a second electrical coil in said circuit connected in parallel with said first electrical coil and when energized operable to provide for movement of said control member to effect movement of said throttle member, a manually actuated switch for closing said circuit to energize said second electrical coil, a holding circuit closable by energization of said second coil to hold said second coil energized after release of said manually actuated switch, circuit means providing for energization of said first coil when said second coil is energized, a driver actuated brake member, and means to de-energize said first and second electrical coils by movement of said brake member to open said holding circuit.

23. In a governing mechanism as defined in claim 22 wherein said circuit means effects energization of said coil in response to energization of said holding circuit and includes contacts connected with said first coil and which are closed upon energization of said second coil.

24. In a governing mechanism as defined in claim 22 wherein an adjustable potentiometer is located in said circuit to adjust the current flowing through said first coil.

25. In a governing mechanism as defined in claim 22 wherein said first coil is connected with the vehicle ignition switch and is energized upon closing thereof.

26. In a governing mechanism as defined in claim 25 wherein an adjustable potentiometer is located in said circuit to adjust the current flowing through said first coil.

27. A mechanism for effecting movement of a vehicle throttle member to control vehicle speed comprising an actuating member movable in one direction to effect movement of the throttle member in a throttle opening direction, vacuum chamber means on one side of said actuating member, said actuating member being movable in said one direction upon creation of a vacuum of a predetermined degree in said vacuum chamber, a valve member movable to control the degree of vacuum in said vacuum chamber, a control member operatively connected with said valve member to effect movement of the valve member upon movement thereof, speed sensing means operatively connected with the control member for applying a force thereto acting upon said control member to tend to move said control member in a first direction so as to cause movement of the valve member to decrease the vacuum in the chamber as the speed of the vehicle increases, and means providing a magnetic force acting on said control member in opposition to said speed sensing means to effect movement of said control member in a second direction opposite said first direction to increase the vacuum in said vacuum chamber as the speed of the vehicle decreases.

28. A mechanism as defined in claim 27 wherein said means for applying said magnetic force to said control member to effect movement of the control member in said second direction comprises an electrical coil energizable to provide a magnetic field acting on said control member urging said control member in said second direction.

29. A mechanism as defined in claim 28 wherein said electrical coil is energized upon depression of an electrical switch in the circuit with said electrical coil, and said switch being mounted on the turn signal lever indicator of the vehicle.

References Cited
UNITED STATES PATENTS

| | | | |
|---|---|---|---|
| 2,642,166 | 6/1953 | Strauss | 192—3 |
| 3,127,966 | 4/1964 | Sheriff et al. | 192—3 |
| 3,243,022 | 3/1966 | Humphrey | 192—3 |

MARK NEWMAN, *Primary Examiner.*

A. T. McKEON, *Assistant Examiner.*

UNITED STATES PATENT OFFICE
CERTIFICATE OF CORRECTION

Patent No. 3,324,978                      June 13, 1967

Robert S. Mueller et al.

It is hereby certified that error appears in the above numbered patent requiring correction and that the said Letters Patent should read as corrected below.

Column 12, line 10, for "for" read -- of -- column 14, line 37, for "diaphrgam" read -- diaphragm --.

Signed and sealed this 2nd day of January 1968.

(SEAL)
Attest:

Edward M. Fletcher, Jr.

Attesting Officer

EDWARD J. BRENNER

Commissioner of Patents